United States Patent
Chauhan et al.

(12) 
(10) Patent No.: US 12,448,055 B2
(45) Date of Patent: *Oct. 21, 2025

(54) ALUMINUM-REINFORCED VEHICLE FRAME

(71) Applicant: Rivian IP Holdings, LLC, Irvine, CA (US)

(72) Inventors: Akshat Chauhan, Livonia, MI (US); Randall R Frank, Northville, MI (US); Barry Lett, Woking (GB); Mohammed Nomaan Khan, Farmington Hills, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/620,594

(22) Filed: Mar. 28, 2024

(65) Prior Publication Data

US 2024/0317324 A1     Sep. 26, 2024

Related U.S. Application Data

(63) Continuation of application No. 17/128,256, filed on Dec. 21, 2020.

(51) Int. Cl.
*B62D 29/00* (2006.01)
*B62D 21/00* (2006.01)
*B62D 65/02* (2006.01)

(52) U.S. Cl.
CPC ........... *B62D 29/008* (2013.01); *B62D 21/00* (2013.01); *B62D 65/02* (2013.01)

(58) Field of Classification Search
CPC ...... B62D 29/008; B62D 21/00; B62D 65/02; B62D 21/02; B62D 21/152
See application file for complete search history.

(56) References Cited

U.S. PATENT DOCUMENTS

| | | | |
|---|---|---|---|
| 6,988,753 B1 * | 1/2006 | Omura | B60R 19/18 293/155 |
| 8,205,921 B2 * | 6/2012 | Baccouche | B60R 19/18 293/122 |
| 8,534,724 B2 * | 9/2013 | Ballesteros | B60R 19/18 293/132 |
| 9,073,502 B2 * | 7/2015 | Blumel | B21C 23/00 |
| 9,358,941 B1 * | 6/2016 | Harris | B60R 19/18 |
| 10,065,587 B2 * | 9/2018 | Martini | B60R 19/03 |
| 2014/0252807 A1 * | 9/2014 | Medina | B62D 65/00 296/204 |

* cited by examiner

*Primary Examiner* — Bayan Salone
(74) *Attorney, Agent, or Firm* — Patterson + Sheridan, LLP

(57) ABSTRACT

Disclosed embodiments include apparatuses, vehicles, and methods for providing a frame insert insertable between sections of a structural frame to provide lateral stiffness to resist deformation of the structural frame. In an illustrative embodiment, an apparatus includes a frame insert configured to be received between sections of a structural frame. The frame insert includes a body of extruded material having opposing ends. Each of the opposing ends is configured to engage an inner face of one of the sections of the structural frame. A plurality of transverse ribs extends between the opposing ends. The plurality of transverse ribs is configured to provide support to the structural frame.

9 Claims, 8 Drawing Sheets

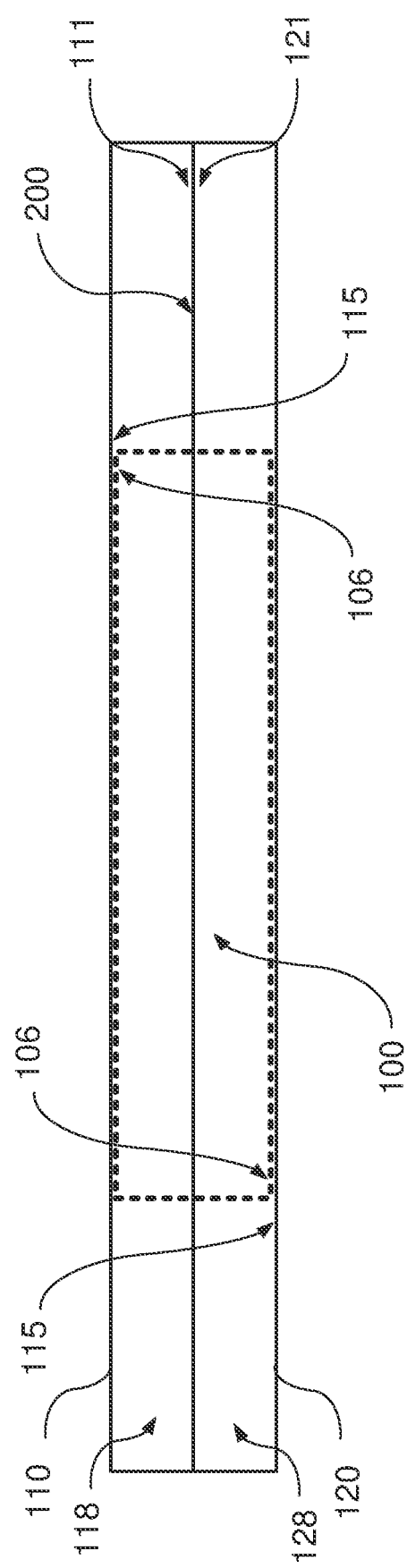
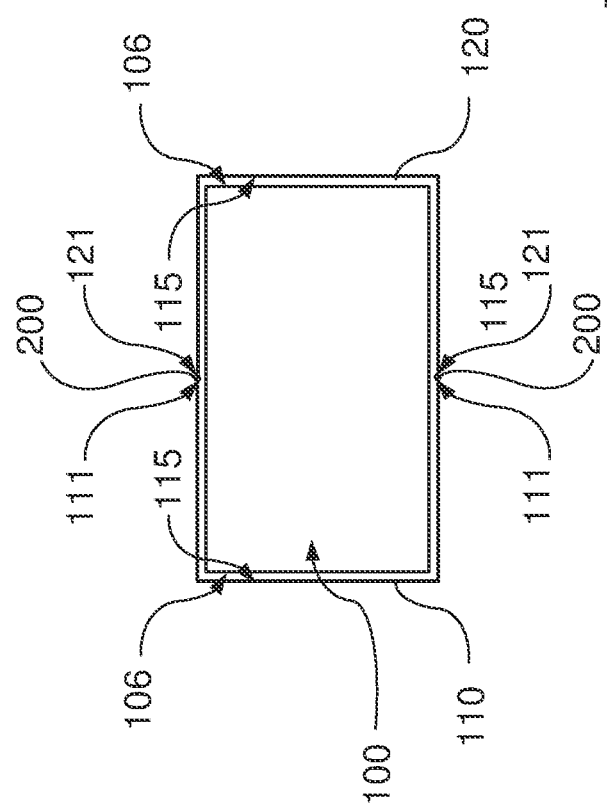

ALUMINUM-REINFORCED VEHICLE FRAME

CROSS-REFERENCE TO RELATED APPLICATIONS

This application claims the benefit of U.S. Nonprovisional patent application Ser. No. 17/128,256 (filed on Dec. 21, 2020), the contents of which are incorporated by reference herein in its entirety.

INTRODUCTION

The present disclosure relates to providing structural support within a structural member.

The statements in this section merely provide background information related to the present disclosure and may not constitute prior art.

Structural members, such as those used in forming vehicle frames, are often formed of elements made of steel. Steel provides high strength and stiffness to support the structure of a vehicle and to at least partially withstand damage resulting from collisions. However, because of the relatively high unit weight of structural steel, using steel in the frame adds significantly to the weight of the vehicle. Thus, to improve vehicle energy efficiency and other performance characteristics, vehicle frames typically use hollow structural members to reduce the weight of the vehicle frame. However, hollow structural members, understandably, do not have the same strength and rigidity of solid structural members.

BRIEF SUMMARY

Disclosed embodiments include apparatuses, vehicles, and methods for providing a frame insert insertable between sections of a structural frame to provide lateral stiffness to help contribute to resisting deformation of the structural frame.

In an illustrative embodiment, an apparatus includes a frame insert configured to be received between sections of a structural frame. The frame insert includes a body of extruded material having opposing ends. Each of the opposing ends is configured to engage an inner face of one of the sections of the structural frame. A plurality of transverse ribs extends between the opposing ends. The plurality of transverse ribs is configured to provide lateral stiffness to provide support to the structural frame.

In another illustrative embodiment, a vehicle includes a vehicle body. The vehicle body includes a structural frame in which at least a portion of the structural frame is comprised of opposing sections. A frame insert is configured to be received between sections of a structural frame. The frame insert includes a body of extruded material having opposing ends. Each of the opposing ends is configured to engage an inner face of one of the sections of the structural frame. A plurality of transverse ribs extends between the opposing ends. The plurality of transverse ribs is configured to provide support to the structural frame. A cabin is incorporated in the vehicle body and is configured to receive contents chosen from at least one of an occupant and cargo. A drive system is supported by the vehicle body and is configured to control a plurality of wheels of the vehicle to motivate, accelerate, decelerate, stop, and steer the vehicle.

In a further illustrative embodiment, a method of forming a frame insert to be received between sections of a structural frame includes forming opposing ends of the frame insert in a body of extruded material. Each of the opposing ends is configured to engage an inner face of one of the sections of the structural frame. A plurality of transverse ribs is provided, where the plurality of transverse ribs extends between the opposing ends. The plurality of transverse ribs is configured to provide support to the structural frame. The frame insert is disposed between the sections of the structural frame.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 2 is a top-down plan view in partial cross-sectional form of structural frame sections joined together and receiving a frame insert therebetween;

FIG. 3 is a cross-sectional view of structural frame sections receiving a frame insert therebetween;

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

The following description explains, by way of illustration only and not of limitation, various embodiments of apparatuses, vehicles, and methods for providing a frame insert insertable between sections of a structural frame to provide support to the structural frame.

Figure 1:
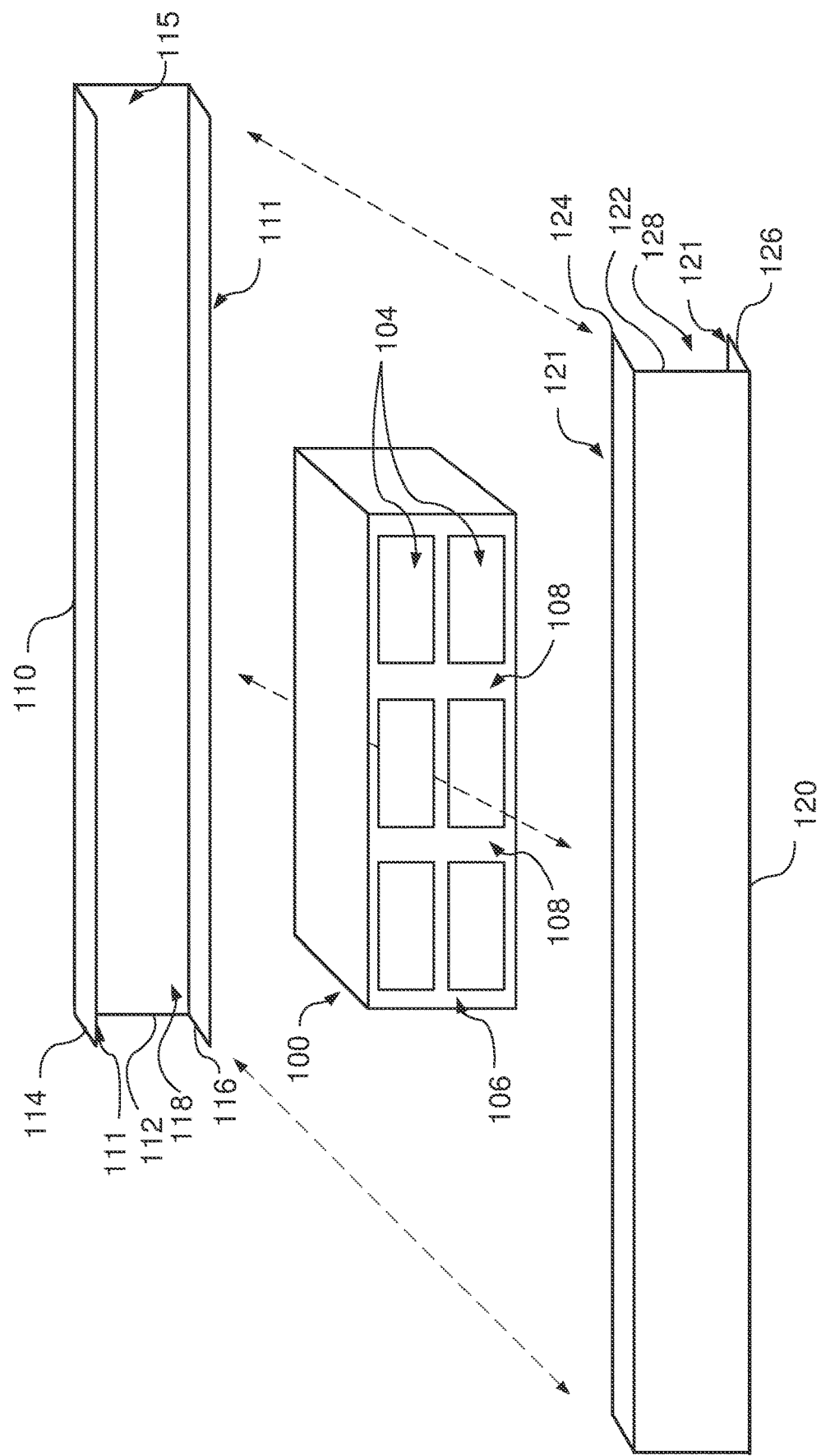
FIG. 1 is a plan view in exploded form of a frame insert receivable between sections of a structural frame.

Referring to FIG. 1, in various embodiments a frame insert 100 is receivable between sections of a structural frame 110 and 120 (hereinafter "structural sections"). In various embodiments, the frame insert includes a body of material 102 that presents ends 106 configured to engage the inner surfaces of the structural sections 110 and 120. In various embodiments, the body of material 102 is comprised of a first material having a lesser density and, thus, a lesser unit weight, than of a second material from which the structural sections 110 and 120 are formed. For example, the body of material 102 of the frame insert 100 may be formed of aluminum, while the structural sections 110 and 120 may be formed of steel.

In various embodiments, to further reduce the weight of the frame insert 100, the body of material 102 that forms the frame insert 100 defines openings 104 that extend through the body of material 102. Transverse ribs 108 extending through the body of material 102 between the ends 106 provide support and stiffness to the structural sections 110 and 120.

In various embodiments, the structural sections 110 and 120 are matable members that are configured to be welded or otherwise joined together along opposing, facing edges 111 and 121. In various embodiments, the structural sections 110 and 120 each include lateral portion 112 and 122 supporting transverse portions 114 and 116 and 124 and 126 that terminate at the facing edges 111 and 121. The lateral portions 112 and 122 and the transverse portions 114, 116, 124, and 126 define recesses 118 and 128 that extend between the lateral portions 112 and 122 that may receive the frame insert 110.

In various embodiments, inner faces 115 of the lateral portions 112 and 122 may engage ends 106 of the frame insert 100 directly. In various embodiments, the inner faces 115 of the lateral portions 112 and 122 may engage ends 106 of the frame insert 100 through an intermediate material such as an adhesive layer, as further described below. Engagement of the ends 106 of the frame insert against the inner faces 115 of the lateral portions 112 and 122 provide structural support to the structural sections 110 and 120, thereby helping contribute to resisting deformation of the structural frame. Although the structural sections 110 and 120 are shown as having generally planar lateral portions 112 and 122 and transverse portions 114, 116, 124, and 126, it will be appreciated that any of these portions also could be curved or otherwise shaped as desired. The frame insert 100 may be shaped to correspond with the shapes of the structural sections 110 and 120, as further described below.

Referring additionally to FIGS. 2 and 3, in various embodiments the frame insert 100 is received between the structural sections 110 and 120. More specifically, the frame insert 100 is received in the recesses 118 and 128 defined by the structural sections 110 and 120, respectively, then the structural sections 110 and 120 are joined together. In various embodiments, the structural sections 110 and 120 are joined by a weld 200 at their facing edges 111 and 121, respectively, or the structural sections may be otherwise mechanically joined together. The ends 106 of the frame insert 100 engage the inner faces 115 of the structural sections 110 and 120 to provide support thereto. It will be appreciated that forces applied to the structural sections 110 and 120 will be resisted by the structural sections 110 and 120 and, because of the engagement of the frame insert 100 with the structural sections 110 and 120, such forces will also be resisted by the frame insert 100.

Figure 4:
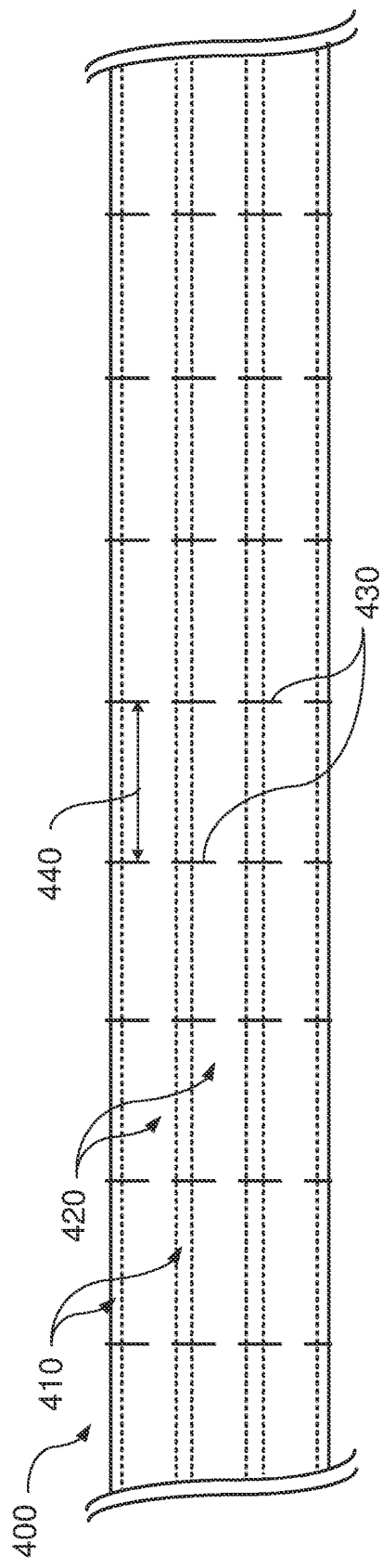
FIGS. 4 and 6 are plan views in partial cross-sectional form of bodies of an extruded material.
Figure 5:
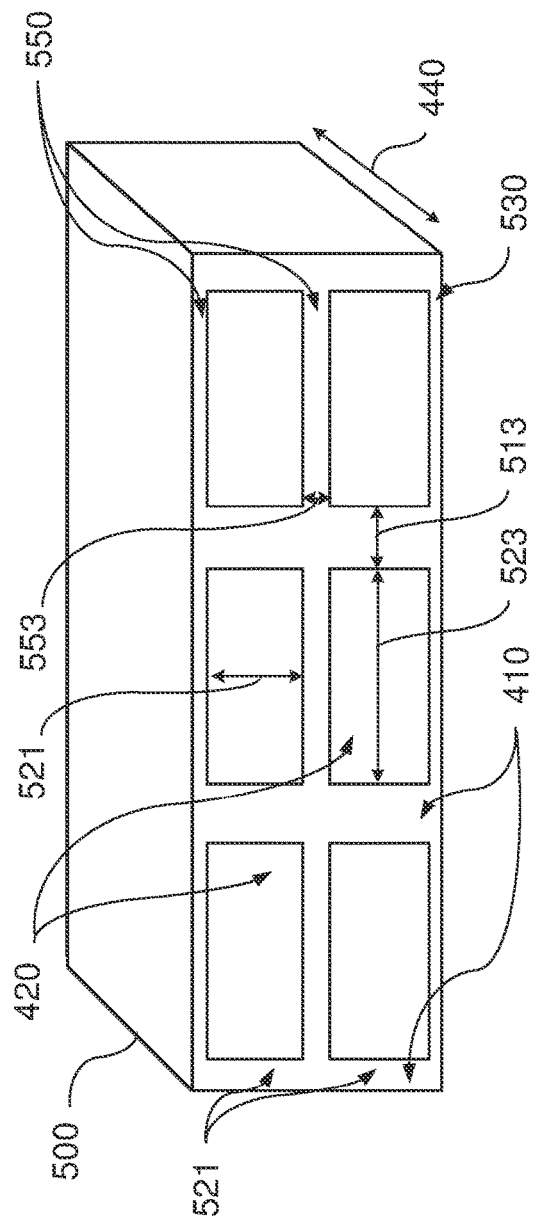
FIGS. 5 and 7 are plan views of frame inserts cut from the bodies of extruded material of FIGS. 4 and 6, respectively.
Figure 6:
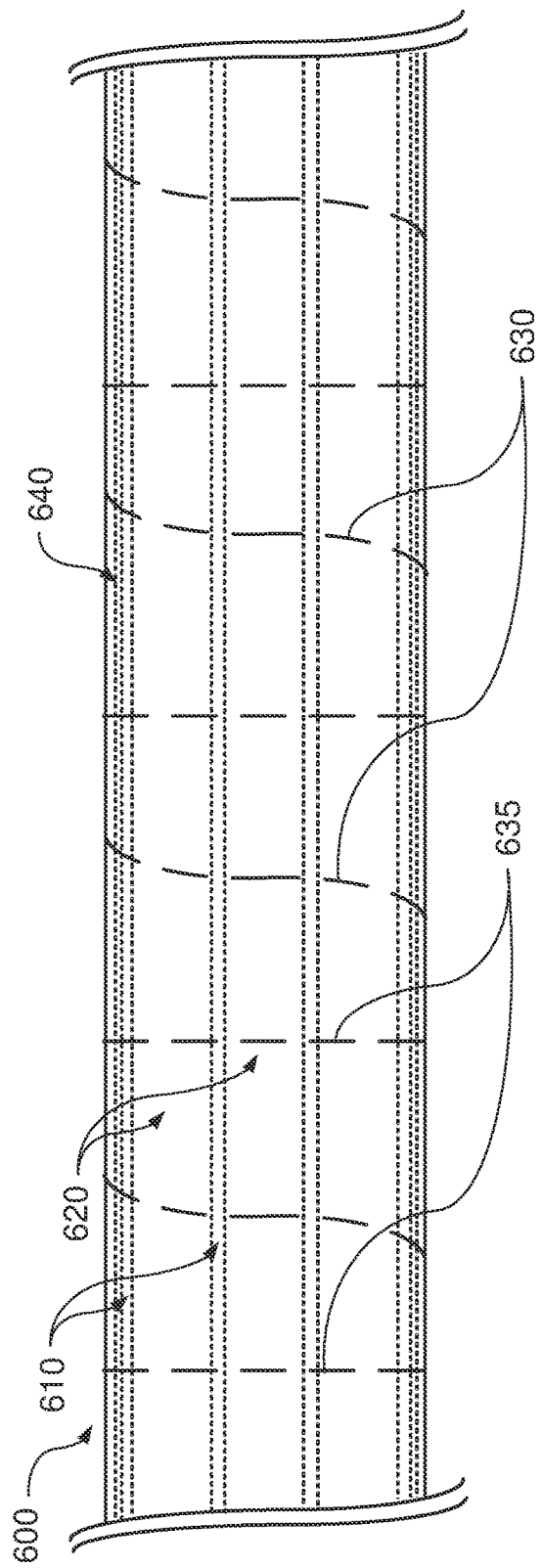

Referring additionally to FIGS. 4 and 6, in various embodiments bodies of extruded material 400 and 600 are formed from which frame inserts 500 and 600 (FIGS. 5 and 7, respectively) may be formed. It will be appreciated that bodies of extruded material 400 and 600 may be formed by forcing hot metal or other material through a die (not shown) configured to define a desired cross-section of the bodies of extruded material 400 and 600.

Referring additionally to FIG. 5, the body of extruded material 400 includes several transverse ribs 410 that define therebetween several openings 420. The body of extruded material 400 also may include multiple orthogonal layers 550 that define therebetween multiple rows 521 of openings 420 that are presented across an end 530 of a frame insert 500 formed from the body of extruded material 400. A thickness 513 of the transverse ribs 410 and a thickness 553 of the orthogonal layers 550 may be determined relative to a height 521 and width 523 of the openings 420 to balance a strength of the frame insert 500 relative to a weight of the frame insert 500. It will be appreciated that increased thickness 513 of the transverse ribs 410 and/or increased thickness 553 of the orthogonal layers 550 may increase strength of the frame insert 500 but at a tradeoff of adding weight to the frame insert 500. It will also be appreciated that the thickness 513 of each of the transverse ribs 410 may be varied independently of each other, as the thickness 553 of the orthogonal layers 550 may be varied independently to provide desired reinforcement at selected locations across the end 530 of the frame insert.

Formation of the frame insert 500 from the body of extruded material 400 may be made by cutting the body of extruded material 400 at locations 430 at predetermined lengths 440 along the body of extruded material 400. As a result, the frame inserts 500 will have widths equivalent to the predetermined lengths 440 between the cuts of the body of extruded material 400. It will be appreciated that the lengths 440 are determined by a size of a space between structural sections of a frame (not shown in FIGS. 4 and 5) between which the frame insert 500 is to be inserted to provide structural support. Although the ends 530 of frame insert 500 are depicted in FIGS. 4 and 5 as being straight, flat ends, as described below, frame inserts may be cut in different shapes to correspond to different shapes of structural sections of a frame.

Figure 7:
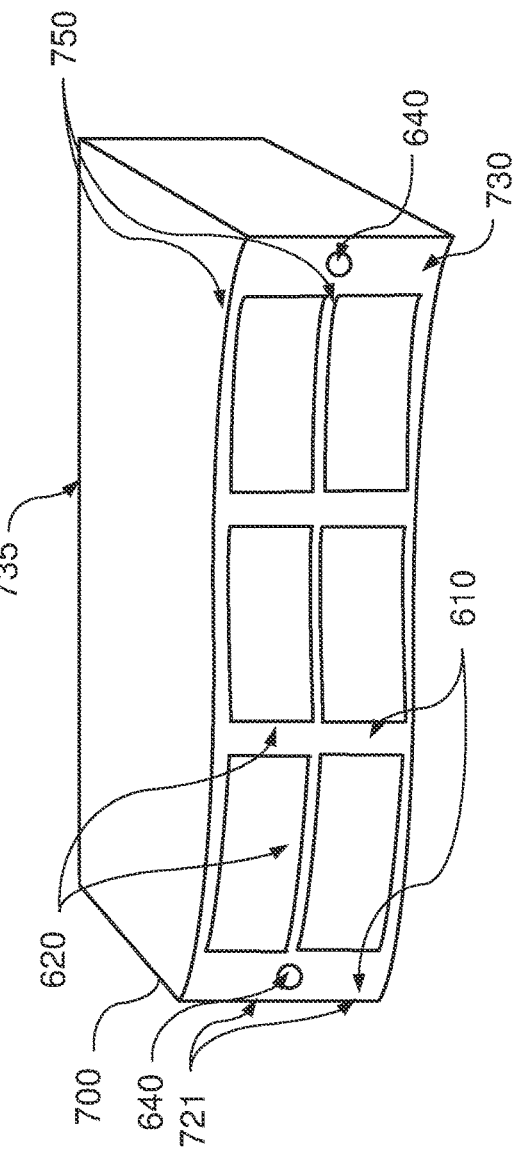

Referring additionally to FIGS. 6 and 7, in various embodiments a body of extruded material 600 again may include several transverse ribs 610 that define therebetween several openings 620. In addition, the body of extruded material 600 may define fastener openings 640 configured to receive fasteners to secure a frame segments 700 formed from the body of extruded material 600 to structural sections of a frame (not shown in FIGS. 6 and 7), as described further below. As in the body of extruded material 400, the body of extruded material 600 also may include multiple orthogonal layers 750 that define therebetween multiple rows 721 of openings 620 that are presented across an end 735 of a frame insert 700 formed from the body of extruded material 600. As previously described with reference to FIGS. 4 and 5, thicknesses of the transverse ribs 610 and the orthogonal layers 750 relative to height and width of the openings 620 may be determined to set a determined of the frame insert 700 relative to its weight to suit particular applications.

As shown in FIG. 7, an end 735 of the frame insert defines the fastener openings 640 that are formed in the body of extruded material 600 to receive fasteners (not shown) to secure the frame insert 700 to one or more structural sections of a frame (not shown in FIG. 7). In addition, it will be appreciated that the end 730 of the frame insert 700 is curved or contoured. The body of extruded material 600 may be alternately cut or otherwise separated using cuts 630 and 635 of different shapes to form the frame insert 700 having differently shaped ends 735 and 730. A curved cut or separation 630 may result in a curved end 730 configured to engage a curved section of a structural section. A flat cut or separation 635 may result in a flat end 735 configured to engage a flat section of another structural section opposite the curved section of a structural section.

In various embodiments, the cuts or separations 630 and 635 may both be straight, curved, angled, or otherwise formed, or the cuts or separations 630 and 635 may be different to form differently shaped ends 730 and 735. It will be also be appreciated that the ends 730 and 735 of the frame insert 700 may be curved or angled across the ends 730 and 735 across both a width and height of each of the ends. Furthermore, it will be appreciated that, in addition to cutting or otherwise separating sections from the body of extruded material 600, the ends 730 and 735 may be further shaped by further cutting, grinding, or other processes to shape the ends 730 and 735 to engage structural sections of different shapes as desired.

Figure 8:
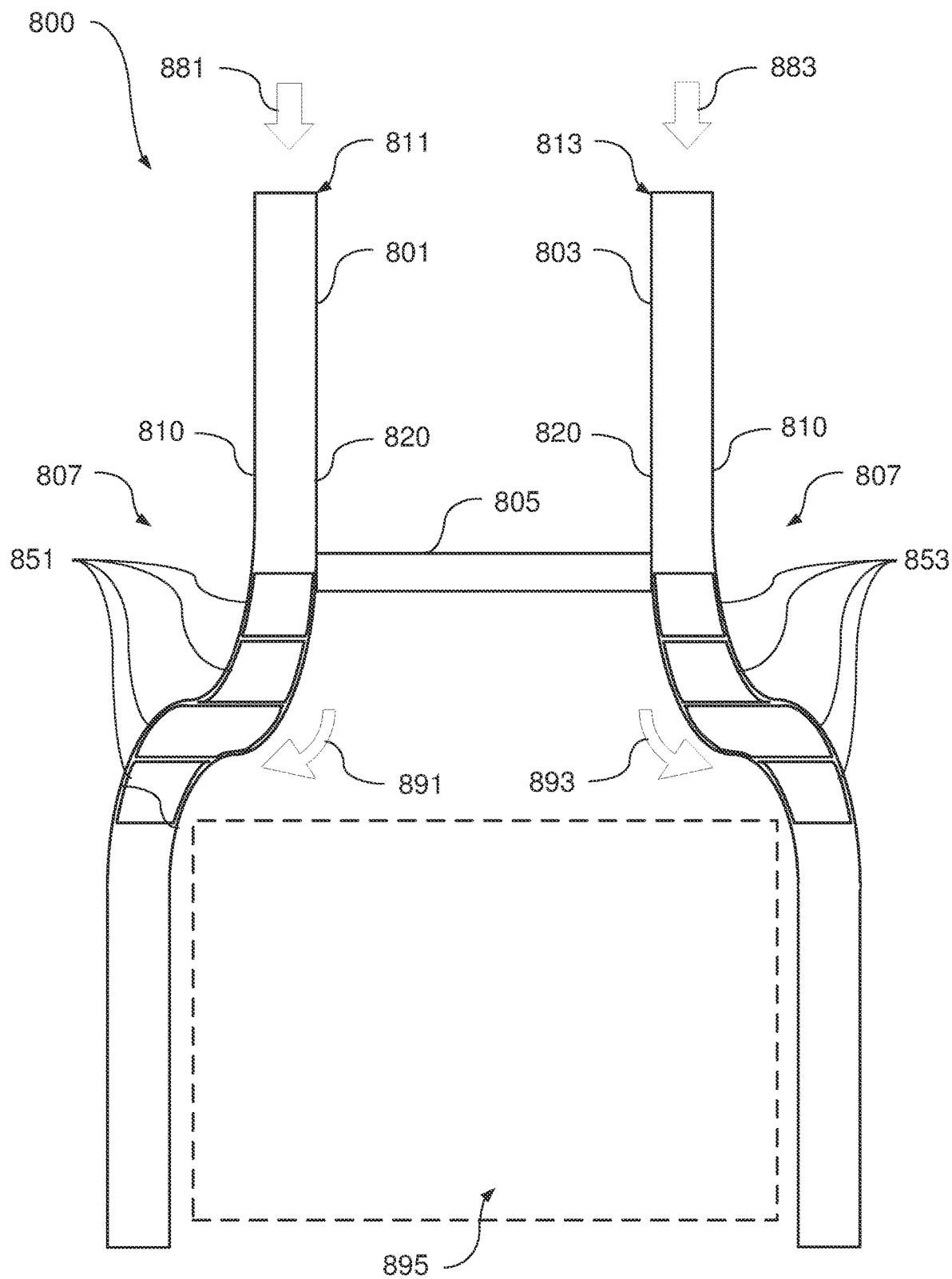
FIG. 8 is a top-down plan view in partial cross-sectional form of a structural frame incorporating frame inserts.

Referring additionally to FIG. 8, in various embodiments a frame 800, such as that of a vehicle (not shown in FIG. 8) may include two sides 801 and 803 joined at one or more cross-members 805. Each of the sides 801 and 803 of the frame 800 may include opposing structural sections 810 and 820 joined at a weld or other juncture (not shown). Each of the sides 801 and 803 may include a curved portion 807, such as are formed in vehicle frames to accommodate wheel wells of the vehicle. Each of the sides 801 and 803 also may include sets of one or more frame inserts 851 and 853 received between the structural sections 810 and 820. The frame 800 shows the structural sections 810 and 820 and the sets of one or more frame inserts 851 and 853 to be received between the structural sections 810 and 820 to be symmetrical. However, it will be appreciated that the frame 800 need not be symmetrical and, thus, neither the structural sections 810 and 820 nor the sets of one or more frame inserts 851 and 853 received between the structural sections 810 and 820 need be symmetrical. For example, when the frame 800 is for a vehicle, the vehicle may be asymmetrical based on placement of doors or various other elements of the vehicle; accordingly, none of the frame 800, the structural sections 810 and 820, the sets of one or more frame inserts 851 and 853 received between the structural sections 810 and 820 also need not be symmetrical.

The frame 800 may be designed to be able to withstand forces 881 and 883 that, for example, impact ends 811 and 813 of the sides 801 and 803, respectively, of the frame 800. The forces 881 and 883 might result in compressive forces along the frame as well as moments 891 and 893, respectively as a result of the curved portions 807 along the sides 801 and 803 of the frame 800. It may be desired to strengthen the frame 800 at or near the curved portions 807 to prevent compression of the frame 800 to protect against collapses of the frame against or into a sensitive region 895 behind the curved portions 807. For example, the sensitive region 895 may include a passenger compartment or may hold fragile or costly components, such as battery cells in an electrically-powered vehicle. The sets of one or more frame inserts 851 and 853 may be configured and positioned to strengthen the sides 801 and 803 of the frame 800 at the curved portions 807 to protect against collapse of the frame 800 against or into the sensitive region 895. The sets of one or more frame inserts 851 and 853, as previously described, may support the structural sections 810 and 820 while limiting additional weight added to strengthen the structural sections 810 and 820.

Figure 9:
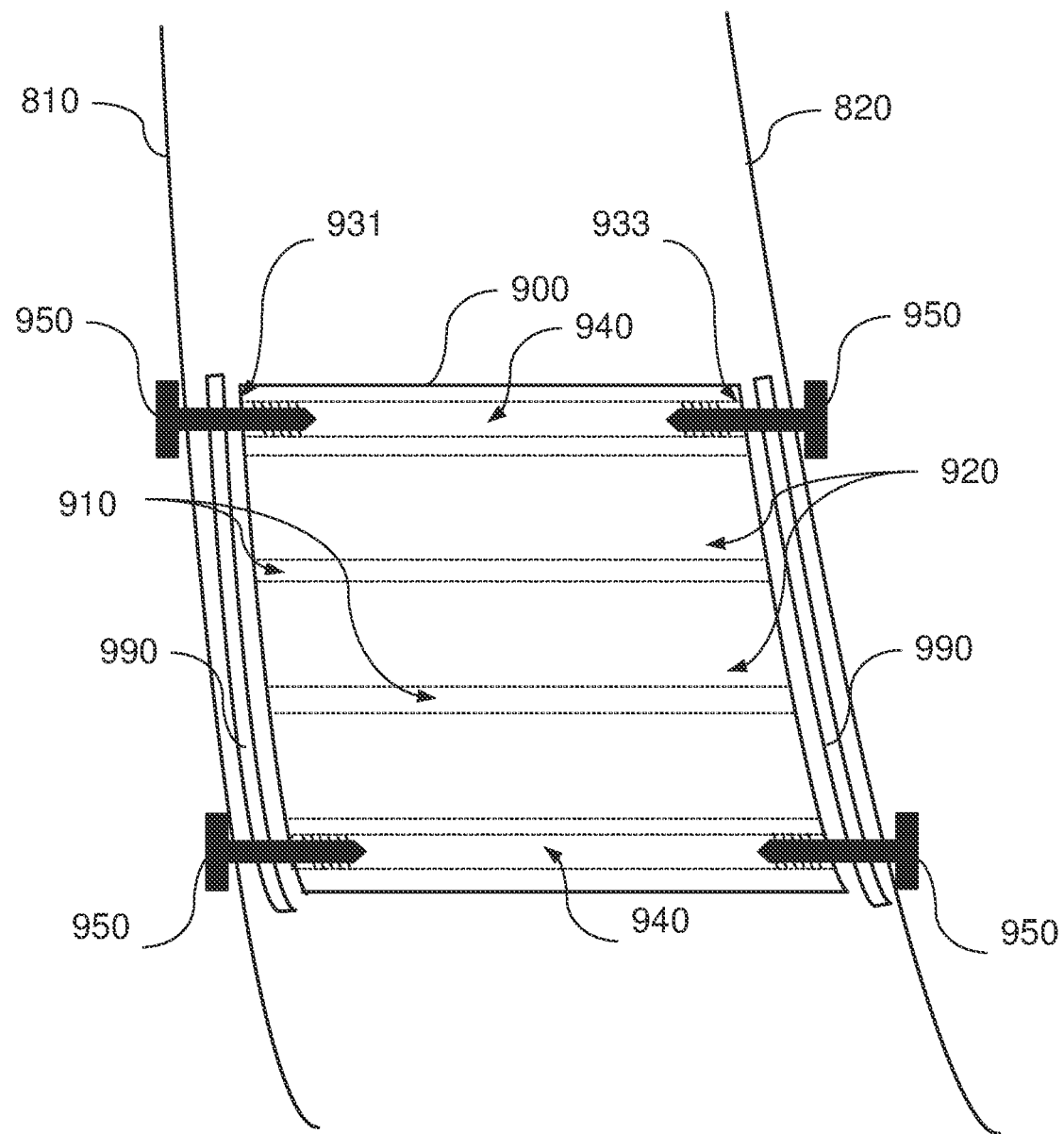
FIG. 9 is a top-down plan view in partial cross-sectional form of a frame insert joined to members of a structural frame.

Referring additionally to FIG. 9, in various embodiments a frame insert 900 is received and attached between the structural sections 810 and 820. The frame insert 900, as previously described, includes transverse ribs 910 that define therebetween openings 920. The frame insert 900 includes opposing ends 931 and 933 shaped to engage the structural sections 820 so that the transverse ribs 910 and/or orthogonal layers (not shown) of the frame insert 900 provide structural support the structural sections 810 and 820. Although the frame insert 900 includes transverse ribs 910 that extend generally perpendicularly between the structural sections 810 and 820, it will be appreciated that the transverse ribs 910 (and the openings 920 defined therebetween) also may be arranged to engage the structural sections 810 and 820 at angles to provide structural support to withstand different types of stresses or other forces on the structural sections 810 and 820 that may be anticipated.

In various embodiments, the frame insert 900 is attached to the structural sections 810 and 820 with connectors 950 that extend through the structural sections 810 and 820 and that are received in fastener openings 940 formed in the frame insert 900, as previously described with reference to FIGS. 6 and 7. The connectors 950 are in the nature of screws, but it will be appreciated that bolts, dowels, pins, or other types of connectors also may be used.

In various embodiments, the frame insert 900 is also secured to the structural sections 810 and 820 with adhesive layers 990. The adhesive layers 990 may further support the attachment of the frame insert 900 to the structural sections 810 and 820, as well as to dampen possible vibration or other movement of the frame insert 900 against the structural sections 810 and 820. In addition, to avoid undesirable potential effects of a junction between two different metals or other materials where the frame insert 900 contacts the structural sections 810 and 820, the adhesive layers 990 may reduce or eliminate electrolytic or other effects that may result at a junction between different materials.

Figure 10:
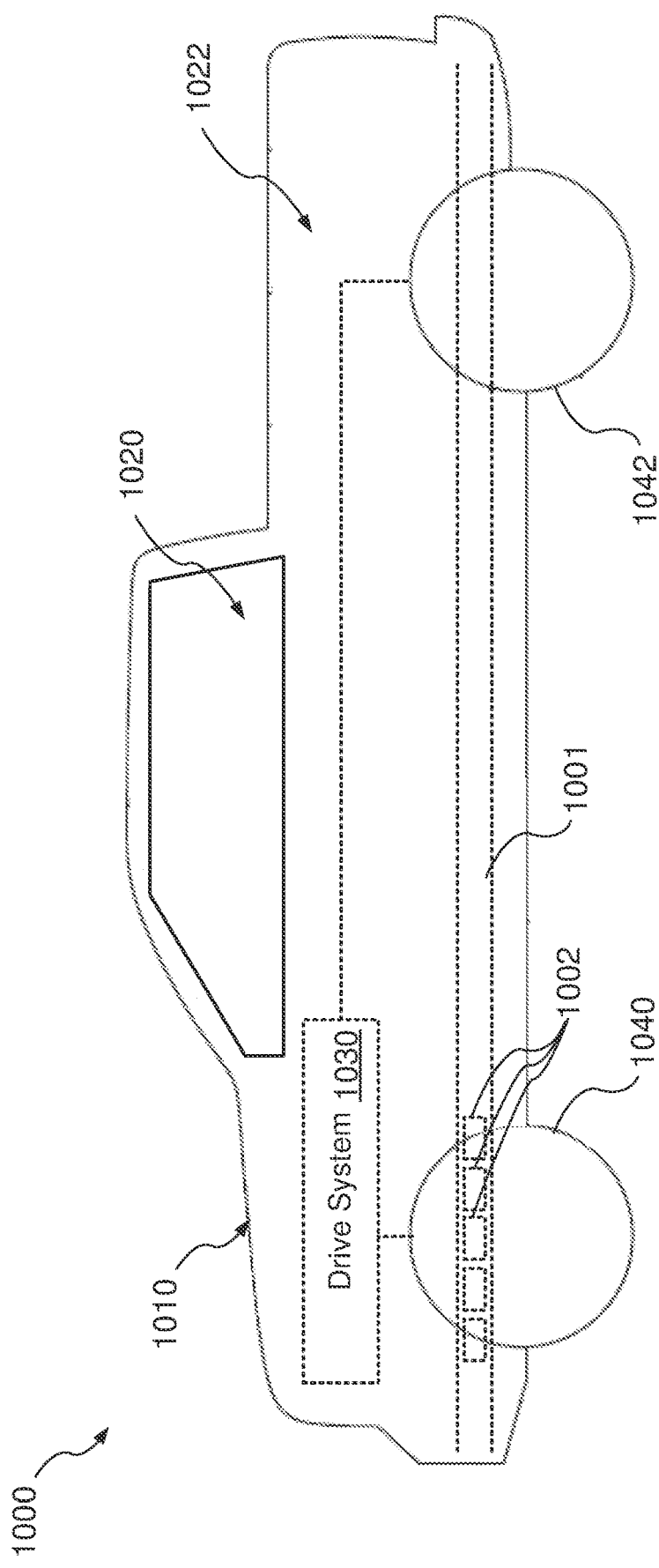
FIG. 10 is a plan view in partial schematic form of a vehicle incorporating frame inserts within its structural frame.

Referring additionally to FIG. 10, in various embodiments a vehicle 1000 may include a frame 1001 that includes one or more frame inserts 1002 between structural sections (not shown in FIG. 10) of the frame 1001. In various embodiments, the vehicle 1000 includes a body 1010 that includes and is supported by the frame 1001. The body 1010 may support a cabin 1020 capable of accommodating an operator, one or more passengers, and/or cargo. In various embodiments, the vehicle 1000 may be controlled by an operator or the vehicle 1000 may be a self-driving vehicle. The vehicle 1000 may be an autonomous vehicle that travels without an operator to transport passengers and/or cargo. The body 1010 also may include a cargo area 1022 separate from the cabin 1020, such as a trunk or a truck bed, capable of transporting cargo. The vehicle 1000 includes a drive system 1030 selectively engageable with one or more front wheels 1040 and/or one or more rear wheels 1042 to motivate, accelerate, decelerate, stop, and steer the vehicle 1000. The drive system 1030 may include an electrically-powered system, a fossil-fuel-powered system, a hybrid system using both electric power and fossil fuels, or another type of power source.

Figure 11:
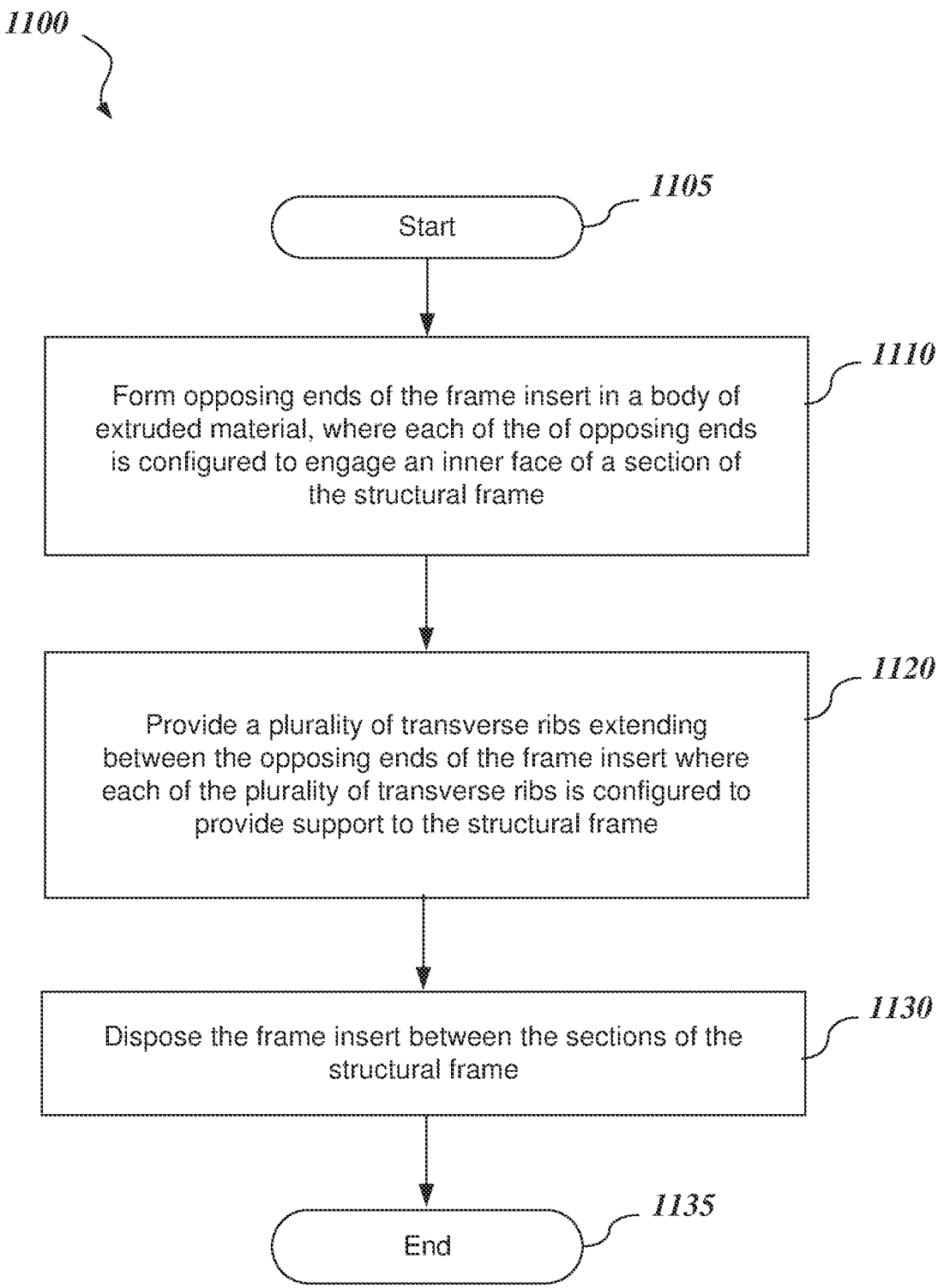
FIG. 11 is a flow chart of an illustrative method of forming a frame insert to be received between sections of a structural frame.

Referring additionally to FIG. 11, in various embodiments an illustrative method 1100 of forming a frame insert to be received between sections of a structural frame is provided. The method 1100 begins at a block 1105. At a block 1110, opposing ends of the frame insert are formed from a body of extruded material where each of the of opposing ends is configured to engage an inner face of one of the sections of the structural frame. At a block 1120, a plurality of transverse ribs is provided, where the plurality of transverse ribs extends between the opposing ends of the frame insert and where each of the plurality of transverse ribs is configured to provide structural support to help contribute to resisting deformation of the structural frame. At a block 1130, the frame insert is disposed between the sections of the structural frame. The method 1100 ends at a block 1135.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
   a structural frame member of a vehicle frame, the structural frame member comprising:
      a first frame section comprising a lateral portion and two transverse portions that define a first recess, the lateral portion including a first inner face, and each transverse portion of the first frame section including a facing edge;
      a second frame section comprising a lateral portion and two transverse portions that define a second recess, the lateral portion including a second inner face, and each transverse portion of the second frame section including a facing edge that is joined to a respective facing edge of the first frame section; and
   a frame insert disposed within an interior of the structural frame member defined by the first recess and the second recess, the frame insert including:
      a first end engaging the first inner face,
      a second end engaging the second inner face, and
      a plurality of transverse ribs extending from the first end to the second end, the plurality of transverse ribs defining openings that extend from the first end to the second end.

2. The apparatus of claim 1, wherein the first frame section and the second frame section are welded together.

3. The apparatus of claim 1, wherein the first frame section and the second frame section are formed from steel, and the frame insert is formed from a material having a lesser density than steel.

4. The apparatus of claim 3, wherein the frame insert is formed from aluminum or nylon.

5. The apparatus of claim 1, wherein:
   the first end defines fastener openings configured to receive fasteners;
   the first end is engaged to the first inner face using connectors that extend through the lateral portion of the first frame section and into the fastener openings;
   the second end defines fastener openings configured to receive fasteners; and
   the second end is engaged to the second inner face using connectors that extend through the lateral portion of the second frame section and into the fastener openings.

6. The apparatus of claim 1, wherein:
   the first end is engaged to the first inner face using an adhesive layer; and
   the second end is engaged to the second inner face using an adhesive layer.

7. The apparatus of claim 1, wherein:
   the first frame section has a straight shape;
   the first end has a straight shape;

the second frame section has a straight shape; and
the second end has a straight shape.

8. The apparatus of claim 1, wherein:
the first frame section has an angled shape;
the first end has an angled shape;
the second frame section has a straight shape or an angled shape; and
the second end has a straight shape or an angled shape.

9. The apparatus of claim 1, wherein:
the first frame section has a curved shape;
the first end has a curved shape;
the second frame section has a straight shape, an angled shape, or a curved shape; and
the second end has a straight shape, an angled shape, or a curved shape.

* * * * *